S. INGERSOLL.
CHUCKS FOR ROCK-DRILLS.
No. 188,141. Patented March 6, 1877.
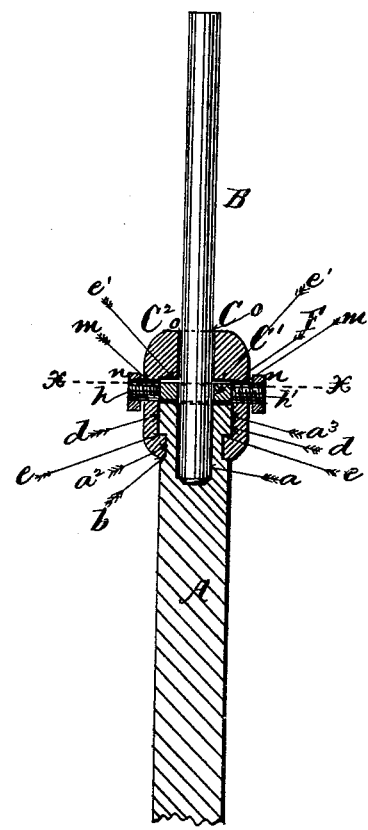
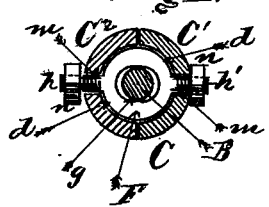
Witnesses:
F. Barritt
Richard Jones
Inventor:
Simon Ingersoll,
Per Henry Gerner,
Atty

UNITED STATES PATENT OFFICE.

SIMON INGERSOLL, OF STAMFORD, CONNECTICUT.

IMPROVEMENT IN CHUCKS FOR ROCK-DRILLS.

Specification forming part of Letters Patent No. 188,141, dated March 6, 1877; application filed August 24, 1876.

*To all whom it may concern:*

Be it known that I, SIMON INGERSOLL, of Stamford, Fairfield county, State of Connecticut, have invented a new and useful Improvement in Chucks for Rock-Drills; and I do hereby declare the following to be a full and clear description thereof, which will enable others to make and use my improved chucks.

This invention relates to an improved chuck for holding the drill to the piston-rod, the arrangement of the parts being such as to withstand the inertia strains to which they are subjected.

The invention will be readily understood by reference to the accompanying drawings, of which—

Figure I is a sectional view of my improved chuck for rock-drills; and Fig. II, a plan sectional view on line $x\ x$, Fig. I.

A is the piston-rod, in the center and outer end of which is cut a hole, $a$, for the reception of the drill B. $a''$ is an annular groove cut into and around the outer circumference at $b$ of the piston A, by which the shoulder $a'''$ is formed on the end of the piston-rod. $C'$ and $C''$ are the two halves of the clamp or chuck C. In the interior of the parts $C'$ and $C''$ are cut semicircular mortises $d$, into which the shoulder $a'''$ fits when the parts of the clamp are assembled. By cutting the mortises $d$ into the parts $C'$ and $C''$ shoulders $e$ and $e'$ are formed. The shoulder $e$ is intended to enter the mortise $a''$ when the parts are assembled. $o\ o$ are semicircular grooves in $C'$ and $C''$, cut into the same for admittance of the drill.

On the top of the piston A, and resting on the same, is placed a sleeve, F, with an oval opening, $g$, in the center, through which the drill B passes. The sleeve F is also provided with the two threaded lugs $h\ h'$, extending outward through the holes $m\ m$ in the chuck parts $C'$ and $C''$. This sleeve is held in its place by the shoulder $e'$. (See Fig. I.) By aid of the nuts $n\ n$ the chuck parts are drawn together and firmly held against the drill B and the piston A, thus holding the former firmly in the latter.

It will be seen that the opening $g$ in the sleeve F is made oval and larger than the drill, so that the sleeve cannot touch the drill when the nuts are tightened.

Having thus described my invention, I desire to claim—

1. The chuck C, with mortises $d$, shoulders $e$ and $e'$, holes $m$, and grooves $o$, in combination with the drill B, piston A, and sleeve F, substantially as described.

2. The sleeve F, with the oval opening $g$, lugs $h$ and $h'$, in combination with the chuck C, substantially as and for the purpose set forth.

SIMON INGERSOLL.

Witnesses:
RICHD. GERNER,
F. BARRITT.